(12) United States Patent
Schuler et al.

(10) Patent No.: US 9,322,430 B2
(45) Date of Patent: Apr. 26, 2016

(54) BEARING FOR A CAMSHAFT, AND A CAMSHAFT

(71) Applicant: Amtek Tekfor Holding GmbH, Offenburg (DE)

(72) Inventors: Markus Schuler, Oberwolfach (DE); Gregor Heitzler, Freiburg (DE); Dieter Steblau, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/365,898

(22) PCT Filed: Dec. 12, 2012

(86) PCT No.: PCT/DE2012/001193
§ 371 (c)(1),
(2) Date: Jun. 16, 2014

(87) PCT Pub. No.: WO2013/087062
PCT Pub. Date: Jun. 20, 2013

(65) Prior Publication Data
US 2014/0341494 A1 Nov. 20, 2014

(30) Foreign Application Priority Data
Dec. 17, 2011 (DE) .......................... 10 2011 121 597

(51) Int. Cl.
*F16C 19/46* (2006.01)
*F16C 33/46* (2006.01)
(Continued)

(52) U.S. Cl.
CPC ................ *F16C 19/46* (2013.01); *F01L 1/047* (2013.01); *F16C 19/466* (2013.01); *F16C 33/46* (2013.01);
(Continued)

(58) Field of Classification Search
CPC ...... F16C 33/46; F16C 33/4605; F16C 19/46; F16C 19/463; F16C 19/466; F16C 2360/18; F16C 33/4623; F16C 33/067; F16C 43/04; F01L 2001/0476; F01L 2001/0471
See application file for complete search history.

(56) References Cited

U.S. PATENT DOCUMENTS 1,523,531 A * 1/1925 Bugatti ........................ 384/454
8,568,038 B2 * 10/2013 Lemaitre et al. ............. 384/576
2010/0129023 A1 5/2010 Lemaitre et al.

FOREIGN PATENT DOCUMENTS

DE 102005018244 A1 11/2005
DE 102006057695 A1 6/2008
(Continued)

OTHER PUBLICATIONS

International Search Report (PCT/ISA/210) dated Apr. 9, 2013 with English translation thereof {Six (6) pages}.
(Continued)

*Primary Examiner* — Alan B Waits
(74) *Attorney, Agent, or Firm* — Bryan Peckjian; SKF USA Inc. Patent Dept.

(57) ABSTRACT

A bearing arrangement for a camshaft and a camshaft are provided. The bearing arrangement includes a bearing point in a bearing support frame that receives a camshaft, a bearing rolling-element cage and a bearing outer sleeve. The rolling-element cage and the outer sleeve are configured such that the outer diameter of the outer sleeve is smaller than the inside diameter of the bearing point and the outer diameter of the rolling-element cage is smaller than the inner diameter of the outer sleeve. The rolling-element cage may be provided with retention features that axially secure the cage to the outer sleeve. The rolling-element cage and/or the outer sleeve may be provided with collars that axially constrain the bearing relative to the support frame. A camshaft including at least one such bearing arrangement is also provided.

8 Claims, 3 Drawing Sheets

(51) Int. Cl.
  *F16C 43/04* (2006.01)
  *F01L 1/047* (2006.01)
  *F16C 35/067* (2006.01)

(52) U.S. Cl.
  CPC ......... *F16C 33/4605* (2013.01); *F16C 33/4623* (2013.01); *F16C 43/04* (2013.01); *F01L 2001/0471* (2013.01); *F01L 2001/0476* (2013.01); *F16C 35/067* (2013.01); *F16C 2360/18* (2013.01)

(56) References Cited

FOREIGN PATENT DOCUMENTS

| DE | 10 2007 013 039 A1 | 9/2008 |
|----|---|---|
| DE | 102009016162 A1 | 10/2010 |
| DE | 10 2010 020 846 A1 | 11/2011 |
| DE | 102010020846 A1 | 11/2011 |
| DE | 102012221604 A1 | 5/2014 |
| EP | 2360382 A2 | 8/2011 |
| JP | H0413820 A | 1/1992 |
| JP | 2007056932 A | 3/2007 |
| JP | 2011169392 A | 9/2011 |
| WO | WO 2012/014069 A1 | 2/2012 |

OTHER PUBLICATIONS

German Search Report dated Nov. 26, 2012 with partial English-translation thereof {Ten (10) pages}.

* cited by examiner

PRIOR ART

BEARING FOR A CAMSHAFT, AND A CAMSHAFT

This application is a National Phase of PCT International Application No. PCT/DE2012/001193, filed Dec. 12, 2012, the entire disclosure of which is herein expressly incorporated by reference.

BACKGROUND AND SUMMARY OF THE INVENTION

The invention relates to a bearing arrangement for at least one camshaft and to a camshaft.

Camshafts are used to control the valves of an internal combustion engine. Typically a camshaft is provided in each case for the intake and exhaust valves, the camshaft being supported in an engine block. The support is achieved by way of bearing bridges, for example, which comprise bearing points for the shaft of the camshaft and in which rolling bearings are introduced. Depending on the design, the bearing bridges are split or in one piece. Non-split bearing bridges are generally associated with problems regarding the axial fixation of the rolling bearings. These generally comprise a rolling element cage, the rolling elements themselves, and an outer sleeve (also referred to as outer ring). In particular the outer raceways of the rolling elements are also located on the outer sleeve.

It is the object of the invention to provide a bearing arrangement for a camshaft that allows the axial fixation of a rolling bearing in a non-split bearing frame.

The invention achieves the object by providing at least one bearing frame, which includes at least one bearing point for accommodating a camshaft, by providing at least one rolling element cage, by providing at least one outer sleeve, and by designing and matching the bearing frame, the rolling element cage and the outer sleeve to each other in such a way that the outer sleeve has a smaller outside diameter than the inside diameter of the bearing point, and the rolling element cage has a smaller outside diameter than the inside diameter of the outer sleeve. The bearing frame is preferably not split. The rolling elements disposed in the rolling element cage can be balls or needles, for example. In one embodiment, two bearings points for accommodating a respective camshaft are provided in the bearing frame.

According to one embodiment, the outer sleeve has a radially outwardly extending edge at one end. The outer sleeve, which is seated inside the rolling element cage, has a radial edge or collar in this embodiment.

According to one embodiment, the rolling element cage has a clip-like structure at one end. The rolling element cage thus comprises a kind of clip or spring shackle at one end, a securing function being exercised by way of this clip or spring shackle.

One embodiment includes that the rolling element cage and the outer sleeve are designed and matched to each other in such a way that the end of the rolling element cage having the clip-like structure extends axially beyond the end of the outer sleeve having the radially outwardly extending edge. One end of the rolling element cage thus projects over the outer sleeve. This affects in particular the clip-like structures, resulting in a blocking function that prevents the rolling element cage from being pulled out of the outer sleeve.

One embodiment includes that the clip-like structure allows a movement of the rolling element cage in an axial direction and prevents it in the opposite direction. The structure allows in particular the rolling element cage to be introduced into the outer sleeve and prevents the reverse process of pulling out the same.

One embodiment includes that the rolling element cage has a radially outwardly extending edge at one end. In this embodiment, the rolling element cage likewise has an edge or a collar.

The invention further relates to a camshaft having at least one bearing arrangement according to at least one of the above embodiments. The camshaft is in particular a composite camshaft, which is to say the individual functional elements, such as the lobes, are manufactured separately and then applied to the shaft as the carrier element.

Other objects, advantages and novel features of the present invention will become apparent from the following detailed description of one or more preferred embodiments when considered in conjunction with the accompanying drawings.

DETAILED DESCRIPTION

Figure 1:
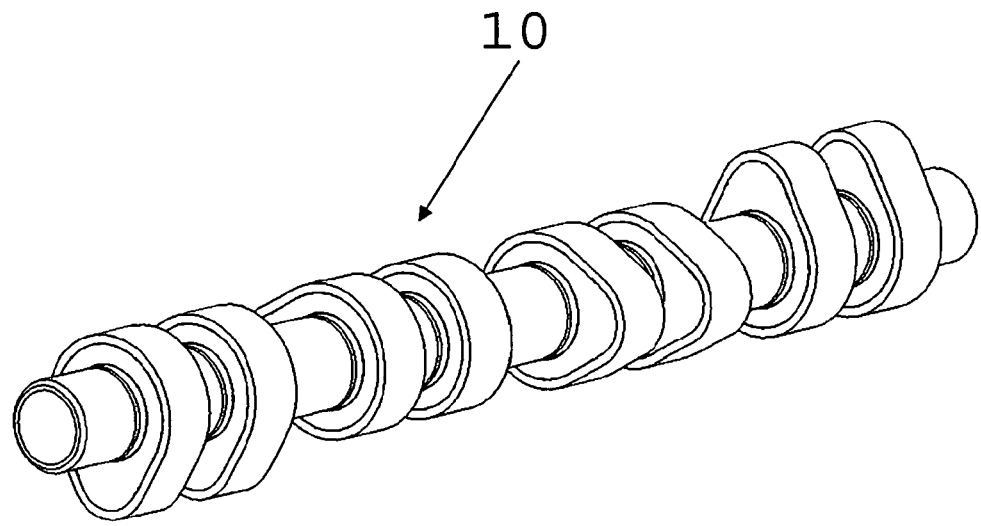
FIG. 1 shows a spatial illustration of a camshaft.
Figure 2:
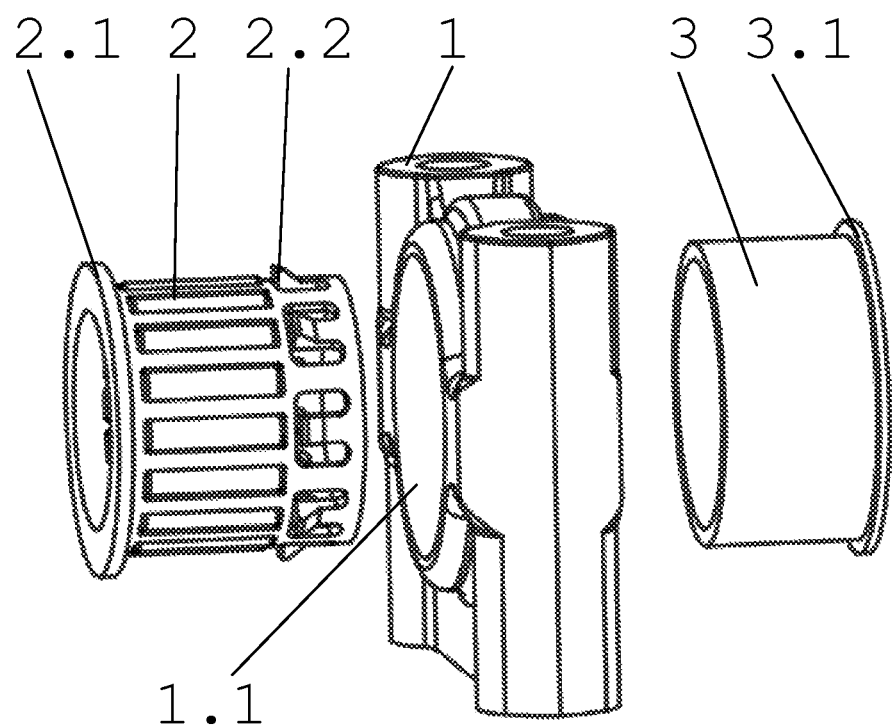
FIG. 2 shows an exploded view of a bearing arrangement for a camshaft according to an embodiment of the present invention.

FIG. 1 shows a camshaft 10 according to the prior art.
FIG. 2 shows an exploded view of a bearing arrangement for a camshaft according to an embodiment of the present invention. A cut-out, which here is round, is provided as the bearing point 1.1 for the camshaft in a non-split bearing frame 1. A rolling bearing is situated in the bearing point 1.1. This bearing includes a rolling element cage 2, an outer sleeve 3 and the rolling elements, which are not shown here. The rolling element cage 2 is situated inside the outer sleeve 3. The rolling element cage 2 has an edge 2.1 as a collar at one end and a clip-like structure 2.2, by way of which the cage is introduced into the outer sleeve 3, at the opposite end. The outer sleeve 3 is essentially designed as a ring, wherein an edge 3.1 is also provided at one end. The edge 3.1 of the outer sleeve 3 and the edge 2.1 of the rolling element cage 2 are located opposite each other. The clip-like structure 2.2. of the rolling element cage 2 allows the rolling element cage 2 to be pushed through the outer sleeve 3, while inhibiting a movement in the opposite direction, which is to say the clip-like structure 2.2 holds the rolling element cage 2 and the outer sleeve 3 together. In addition, an axial movement of the rolling bearing is prevented by the two edges 2.1, 3.1.

Figure 3:
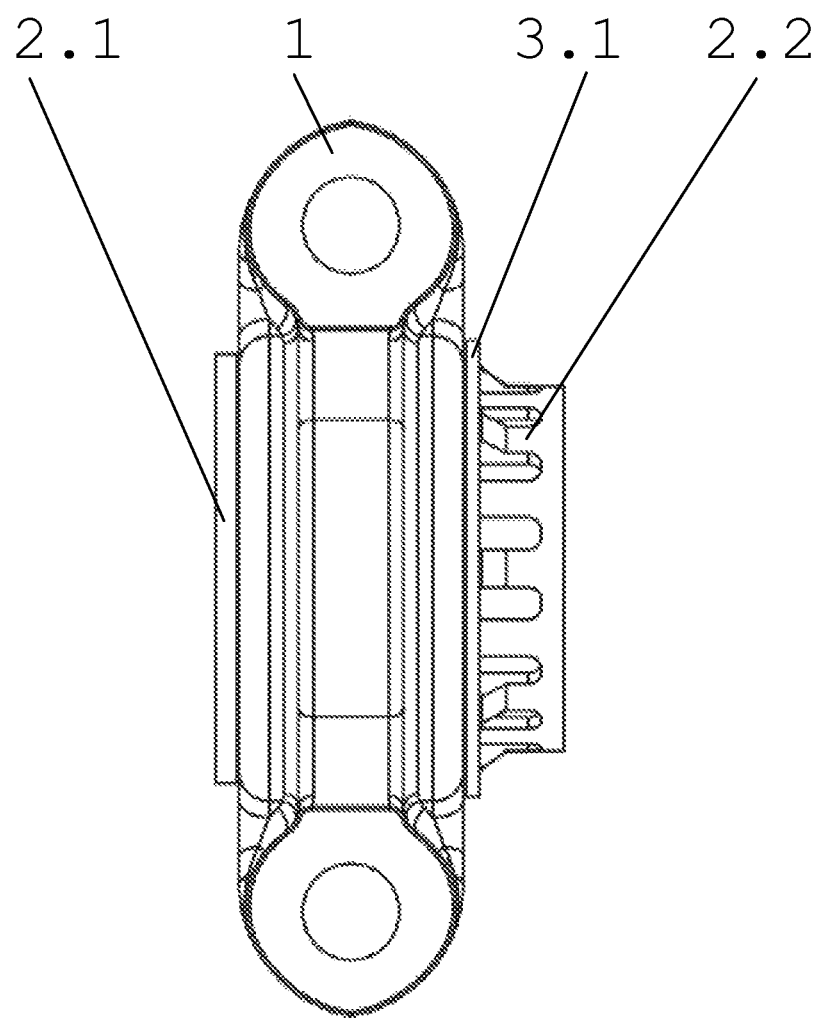
FIG. 3 shows a top view of the assembled bearing arrangement of FIG. 2.

The top view of FIG. 3 shows that the rolling element cage, the outer sleeve and the bearing frame 1, or specifically the bearing point in the bearing frame, are designed and matched to each other in such a way that the edges 2.1, 3.1 of the rolling element cage 2 and of the outer sleeve 3 end with the bearing frame 1. It can also be seen how the clip-like structure 2.2 of the rolling element cage 2 projects over the end of the outer sleeve 3 and thereby ensures the fixation of the two elements, which is to say the rolling element cage 2 and the outer sleeve 3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A bearing arrangement for a camshaft, comprising:
a bearing frame that cannot be disassembled into multiple bearing frame segments such that the bearing frame is a non-split bearing frame, the bearing frame having an inner frame surface configured to receive an outer sleeve;
a rolling element cage having inner and outer cage surfaces and having first and second axial cage ends, the rolling element cage having a cage edge disposed on the first axial cage end which extends radially outwardly from the outer cage surface, the rolling element cage having a radially compressible cage protrusion proximate the second axial cage end which extends radially outwardly from the outer cage surface; and
the outer sleeve having inner and outer sleeve surfaces and having first and second axial sleeve ends, a sleeve edge is disposed on the first axial sleeve end and extends radially outwardly from the outer sleeve surface, the second axial sleeve end having a same diameter as the outer sleeve surface,
the bearing frame, the rolling element cage and the outer sleeve are configured such that the outer sleeve surface is disposed radially within the inner frame surface, and the cage outer surface is located radially within the inner sleeve surface, and
the second axial sleeve end of the outer sleeve is disposed axially adjacent to the cage edge of the rolling element cage while the radially compressible cage protrusion of the rolling element cage axially abuts the sleeve edge of the outer sleeve without abutting the bearing frame, wherein the rolling element cage is configured to have the camshaft positioned therethrough.

2. A bearing arrangement according to claim 1, wherein the rolling element cage and the outer sleeve are configured such that the second axial cage end extends axially beyond the first axial sleeve end.

3. The bearing arrangement according to claim 1, wherein the radially compressible cage protrusion allows movement of the rolling element cage in a first axial direction of the bearing arrangement and prevents movement of the rolling element cage in a direction opposite the first axial direction.

4. The bearing arrangement according to claim 2, wherein the radially compressible cage protrusion allows movement of the rolling element cage in a first axial direction of the bearing arrangement and prevents movement of the rolling element cage in a direction opposite the first axial direction.

5. A combination shaft and bearing arrangement, comprising:
a shaft; and
a bearing arrangement configured to support the shaft, the bearing arrangement including:
a bearing frame that cannot be disassembled into multiple bearing frame segments such that the bearing frame is a non-split bearing frame, the bearing frame having an inner frame surface configured to receive an outer sleeve;
a rolling element cage having inner and outer cage surfaces and having first and second axial cage ends, the rolling element cage having a cage edge disposed on the first axial cage end which extends radially outwardly from the outer cage surface, the rolling element cage having a radially compressible cage protrusion proximate the second axial cage end which extends radially outwardly from the outer cage surface; and
the outer sleeve having inner and outer sleeve surfaces and having first and second axial sleeve ends, a sleeve edge is disposed on the first axial sleeve end and extends radially outwardly from the outer sleeve surface, the second axial sleeve end having a same diameter as the outer sleeve surface,
the bearing frame, the rolling element cage and the outer sleeve are configured such that the outer sleeve surface is disposed radially within the inner frame surface, and the cage outer surface is located radially within the inner sleeve surface, and
the second axial sleeve end of the outer sleeve is disposed axially adjacent to the cage edge of the rolling element cage while the radially compressible cage protrusion of the rolling element cage axially abuts the sleeve edge of the outer sleeve without abutting the bearing frame, wherein the rolling element cage is configured to have the shaft positioned therethrough.

6. A combination according to claim 5, wherein the rolling element cage and the outer sleeve are configured such that the second axial cage end extends axially beyond the first axial sleeve end.

7. The combination according to claim 5, wherein
the radially compressible cage protrusion allows movement of the rolling element cage in a first axial direction of the bearing arrangement and prevents movement of the rolling element cage in a direction opposite the first axial direction.

8. The combination according to claim 6, wherein
the radially compressible cage protrusion allows movement of the rolling element cage in a first axial direction of the bearing arrangement and prevents movement of the rolling element cage in a direction opposite the first axial direction.

* * * * *